United States Patent
LaPorte et al.

(10) Patent No.: US 8,660,720 B2
(45) Date of Patent: Feb. 25, 2014

(54) METHOD AND DEVICE FOR DETERMINING A TAKEOFF TRAJECTORY ALLOWING TO MAXIMIZE THE TAKEOFF WEIGHT OF AN AIRCRAFT

(75) Inventors: Serge LaPorte, Aurade (FR); Bastien Talgorn, Toulouse (FR)

(73) Assignee: Airbus Operations (SAS), Toulouse Cedex (FR)

( * ) Notice: Subject to any disclaimer, the term of this patent is extended or adjusted under 35 U.S.C. 154(b) by 494 days.

(21) Appl. No.: 12/958,650

(22) Filed: Dec. 2, 2010

(65) Prior Publication Data

US 2011/0130896 A1  Jun. 2, 2011

(30) Foreign Application Priority Data

Dec. 2, 2009  (FR) ..................................... 09 05820

(51) Int. Cl.
*G06F 19/00*  (2011.01)
(52) U.S. Cl.
USPC ............. 701/15; 701/301; 701/410; 340/901; 244/186
(58) Field of Classification Search
USPC ......... 701/4, 8, 9, 16, 18, 301, 400, 5, 6, 410; 340/903, 970, 901; 244/160, 63, 164, 244/186
See application file for complete search history.

(56) References Cited

U.S. PATENT DOCUMENTS

| | | | | |
|---|---|---|---|---|
| 3,702,688 A | * | 11/1972 | Faget | 244/159.3 |
| 4,265,416 A | * | 5/1981 | Jackson et al. | 244/2 |
| 7,302,318 B2 | * | 11/2007 | Gerrity et al. | 701/16 |
| 8,254,289 B2 | * | 8/2012 | Tatsumi et al. | 370/254 |
| 2006/0253232 A1 | * | 11/2006 | Gerrity et al. | 701/16 |
| 2008/0177431 A1 | | 7/2008 | Coulmeau et al. | |
| 2008/0288169 A1 | | 11/2008 | Meunier et al. | |
| 2009/0112535 A1 | * | 4/2009 | Phillips | 703/2 |

FOREIGN PATENT DOCUMENTS

| | | |
|---|---|---|
| FR | 2893146 | 5/2007 |
| FR | 2909460 | 6/2008 |

OTHER PUBLICATIONS

French Patent Office, Preliminary Search Report, and Form FR-237.

* cited by examiner

*Primary Examiner* — Ronnie Mancho (74) *Attorney, Agent, or Firm* — Wood, Herron & Evans, LLP (57) ABSTRACT

A trajectory analysis device automatically determines an auxiliary takeoff trajectory including a curvilinear lateral profile, which allows to maximize the takeoff weight of the aircraft. To this end, the device includes an initial data generation device, an auxiliary takeoff trajectory determination device, and a display device. The crew of the aircraft may then review the optimized auxiliary takeoff trajectory.

8 Claims, 4 Drawing Sheets

METHOD AND DEVICE FOR DETERMINING A TAKEOFF TRAJECTORY ALLOWING TO MAXIMIZE THE TAKEOFF WEIGHT OF AN AIRCRAFT

TECHNICAL FIELD

The present invention relates to a method and a device for determining a takeoff trajectory of an aircraft for maximizing the takeoff weight of the aircraft, in particular of a transport airplane.

BACKGROUND

It is known that the takeoff of aircrafts should meet safety requirements being defined by the air regulation. In particular, when an engine breakdown occurs upon the takeoff of an aircraft, it is necessary to make sure that flying over obstacles such as mountains, antennas, trees or buildings, being located in the vicinity of the takeoff runway along the trajectory followed by the aircraft, remains possible, and this, with a sufficient safety margin.

Such a constraint could require the crew to limit the maximum takeoff weight of the aircraft, so as to allow the latter to generate a climbing slope sufficient for avoiding the obstacles.

In order to reduce the extent of such a constraint on the value of the maximum weight, an auxiliary takeoff trajectory (commonly referred to using the English acronym EOSID, for <<Engine Out Standard Instrument Departure>>) enabling a takeoff with a defective engine is determined in addition to a rectilinear standard takeoff trajectory (commonly referred to using the English acronym SID, for <<Standard Instrument Departure>>) being contemplated for a takeoff of the aircraft without any engine breakdown. Such an auxiliary takeoff trajectory diverges, at a divergence point, from the standard takeoff trajectory (being thus defined for an aircraft having all the engines thereof operating normally). Said takeoff (standard and auxiliary) trajectories allow to fly over obstacles located along their respective lateral profiles. The auxiliary takeoff trajectory that enables to by-pass high obstacles thus allows for a higher maximum takeoff weight than the standard takeoff trajectory.

Said divergence point is defined so that, if an engine breakdown occurs upstream (or at the level) of such a divergence point, the pilot turns off the aircraft to the auxiliary takeoff trajectory when the aircraft reaches said divergence point. On the other hand, if the engine breakdown occurs when the aircraft has exceeded the divergence point, the pilot continues the takeoff of the aircraft on the standard takeoff trajectory.

Furthermore, a decision speed is known, being defined so that, if an engine breakdown occurs while running on the runway for taking off while the aircraft has not reached such a decision speed yet, the remaining runway length is sufficient for allowing the aircraft to slow down and to stop within the boundaries of the runway. On the other hand, when an engine breakdown occurs while the speed of the aircraft is equal to or higher than such a decision speed, the aircraft is no longer able to stop on the remaining runway length and should therefore continue the takeoff.

A method for determining an EOSID auxiliary takeoff trajectory is known. Such a method is implemented either directly by airline companies when they have available a department able to perform such a task successfully, or by the aircraft manufacturer. This is a laborious task requiring the interactive use of several specific softwares and could take up to one week of work for a specialized team. Despite the use of softwares, such a usual method thus supposes a significant and expensive human involvement.

In addition, such a known method does not take into consideration, for determining the auxiliary takeoff trajectory, a possible engine breakdown occurring at a speed of the aircraft higher than the decision speed. Now, in such a situation, the effective speed of the aircraft on the auxiliary takeoff trajectory from the divergence point is higher than the speed of the aircraft contemplated for an engine breakdown occurring at the decision speed.

Since the turn radius is an increasing function of the aircraft speed and a decreasing function of the rolling angle of the aircraft, the follow-up of the piloting instructions for the nominal auxiliary takeoff (that is, established for an engine breakdown occurring at the decision speed), for which turns are taken at constant rolling, for example at 15 degrees, results in more significant turn radii than for a breakdown at the decision speed. Too late an engine breakdown could therefore result in an effective auxiliary takeoff trajectory, the ground track of which substantially differs from that of the nominal auxiliary takeoff trajectory, that could create collision risks with obstacles, more particular in a mountain area.

Furthermore, if an auxiliary takeoff trajectory has been found allowing for the takeoff of the aircraft at a high maximum weight, it is not ensured that the aircraft will be able to fly over, with such a high maximum weight, obstacles on the standard takeoff trajectory with all its engines in operation, and all the more with an engine breakdown occurring after the divergence point.

The present invention aims at remedying such drawbacks and determining an optimum auxiliary takeoff trajectory regarding the maximum takeoff weight, while meeting the regulation constraints (calculated for breakdown occurring at the decision speed) and ensuring flying over obstacles for an engine breakdown occurring at any subsequent time.

SUMMARY OF INVENTION

More precisely, the present invention relates to a method for determining at least one auxiliary takeoff trajectory of an aircraft for maximizing the takeoff weight of the aircraft, said auxiliary takeoff trajectory comprising a curvilinear lateral profile and diverging at a divergence point from a standard takeoff trajectory comprising a lateral (generally rectilinear) profile and being defined for an aircraft having all its engines operating normally, said auxiliary takeoff trajectory being defined in turn for an aircraft having at least one engine being defective, said takeoff trajectories allowing to fly over obstacles located along their respective lateral profiles.

To this end, according to this invention, said method wherein:

a) initial data comprising the lateral profile of the standard takeoff trajectory, data relating to the environment of the takeoff airport, and nominal takeoff conditions are generated;

b) based on said initial data, an auxiliary takeoff trajectory is determined, as well as obstacles likely to be flown over for the nominal takeoff conditions; and c) the results of the processings carried out at step b) are presented to an operator, is remarkable in that step b) is carried out completely automatically, and in that at step b), an optimization is carried out so as to obtain an optimum auxiliary takeoff trajectory taking into consideration various takeoff conditions (not being restricted only to the nominal conditions), as well as additional obstacles likely to be flown over for non nominal takeoff conditions.

Within the scope of this invention, the nominal takeoff conditions include particular, so-called nominal, weather conditions (wind, temperature) and aerodynamic configuration, representing the preliminarily contemplated situation, and they take into consideration a breakdown occurring at the decision speed.

Thus, by this invention, the trajectory (auxiliary takeoff trajectory) is automatically determined for maximizing the takeoff weight of the aircraft, allowing to remedy the problem of a very significant work load resulting from the usual determination of such a trajectory.

In addition, according to the invention, said method is optimized so as to obtain an optimum auxiliary takeoff trajectory taking into consideration various takeoff conditions (non being restricted only to the nominal conditions). It also allows to obtain additional obstacles likely to be flown over for non nominal takeoff conditions (weather conditions different from nominal weather conditions, aerodynamic configuration different from the nominal configuration, an engine breakdown occurring at a speed different from the decision speed).

In a preferred embodiment, at step b), the following steps are automatically implemented:
b1) from the lateral profile of the standard takeoff trajectory, an initial maximum weight and initial characteristic speeds are determined allowing to carry out a takeoff on said standard takeoff trajectory;
b2) by a first evaluator (carrying out iterative processing), a maximum takeoff weight and associated characteristic speeds are determined, relating to a given auxiliary trajectory and to nominal conditions, as well as dimensioning obstacles for such nominal conditions, said first evaluator using, to this end, said initial maximum weight and said initial characteristic speeds, as well as an additional set of obstacles and piloting instructions describing an auxiliary takeoff trajectory;
b3) said first evaluator is integrated into a second evaluator (also carrying out iterative processing) allowing to identify the set of dimensioning obstacles for breakdowns occurring between a decision speed and the speed at said divergence point for the auxiliary takeoff trajectory and at the divergence speed for the standard takeoff trajectory; and
b4) an optimization is carried out modifying the auxiliary takeoff trajectory used at step b2), and this, until an optimum auxiliary takeoff trajectory is obtained.

Moreover, advantageously, for implementing step b), processing means of the genetic type are used.

The method according to this invention thus allows to determine an optimum auxiliary takeoff trajectory regarding the maximum takeoff weight, while meeting the regulation constraints (calculated for breakdown occurring at the decision speed) and ensuring flying over obstacles for an engine breakdown occurring at any subsequent time.

Furthermore, advantageously, by said optimum auxiliary takeoff trajectory and said obstacles likely to be flown over, the maximum takeoff weight is calculated, corresponding to a takeoff along said optimum auxiliary takeoff trajectory obtained as set forth herein above.

The present invention further relates to a device for determining at least one auxiliary takeoff trajectory of an aircraft for maximizing the takeoff weight of the aircraft.

According to the invention, the device is of the type comprising:
an initial data generation device for generating initial data comprising the lateral profile of the standard takeoff trajectory, data relating to the environment of the takeoff airport, and nominal takeoff conditions;
an auxiliary trajectory determination device for determining, based on said initial data, an auxiliary takeoff trajectory, as well as obstacles likely to be flown over for the nominal takeoff conditions; and
a display device for presenting the results of the processing carried out by the an auxiliary trajectory determination device to an operator,
and is remarkable in that the auxiliary trajectory determination device is completely automatic, and in that the auxiliary trajectory determination device comprises elements for carrying out an optimization so as to obtain an auxiliary takeoff trajectory taking into consideration various takeoff conditions, as well as additional obstacles likely to be flown over for non nominal takeoff conditions.

BRIEF DESCRIPTION OF THE DRAWINGS

The FIGS. of the appended drawing will better explain how this invention can be implemented. In such FIGS., identical reference numerals relate to similar components.

DETAILED DESCRIPTION

Figure 1:
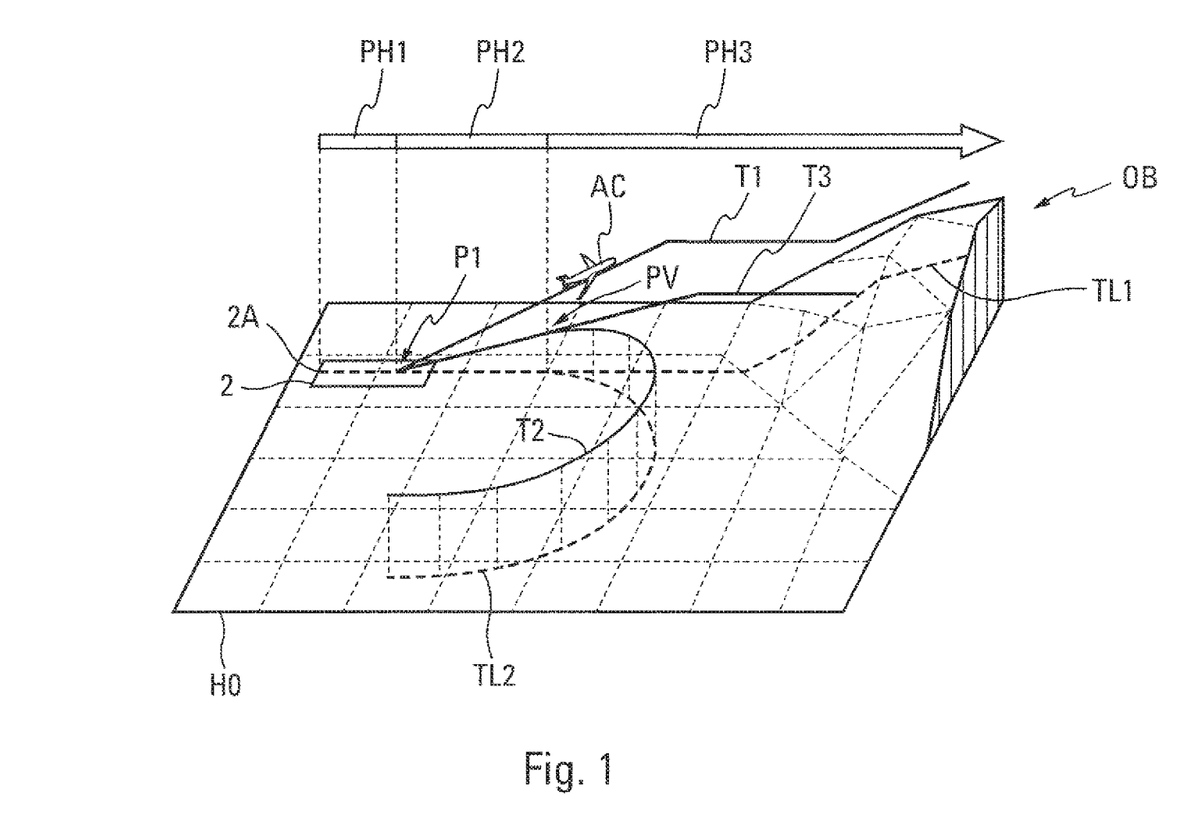
FIG. 1 is a diagram emphasizing different takeoff trajectories likely to be followed by an aircraft.
Figure 2:
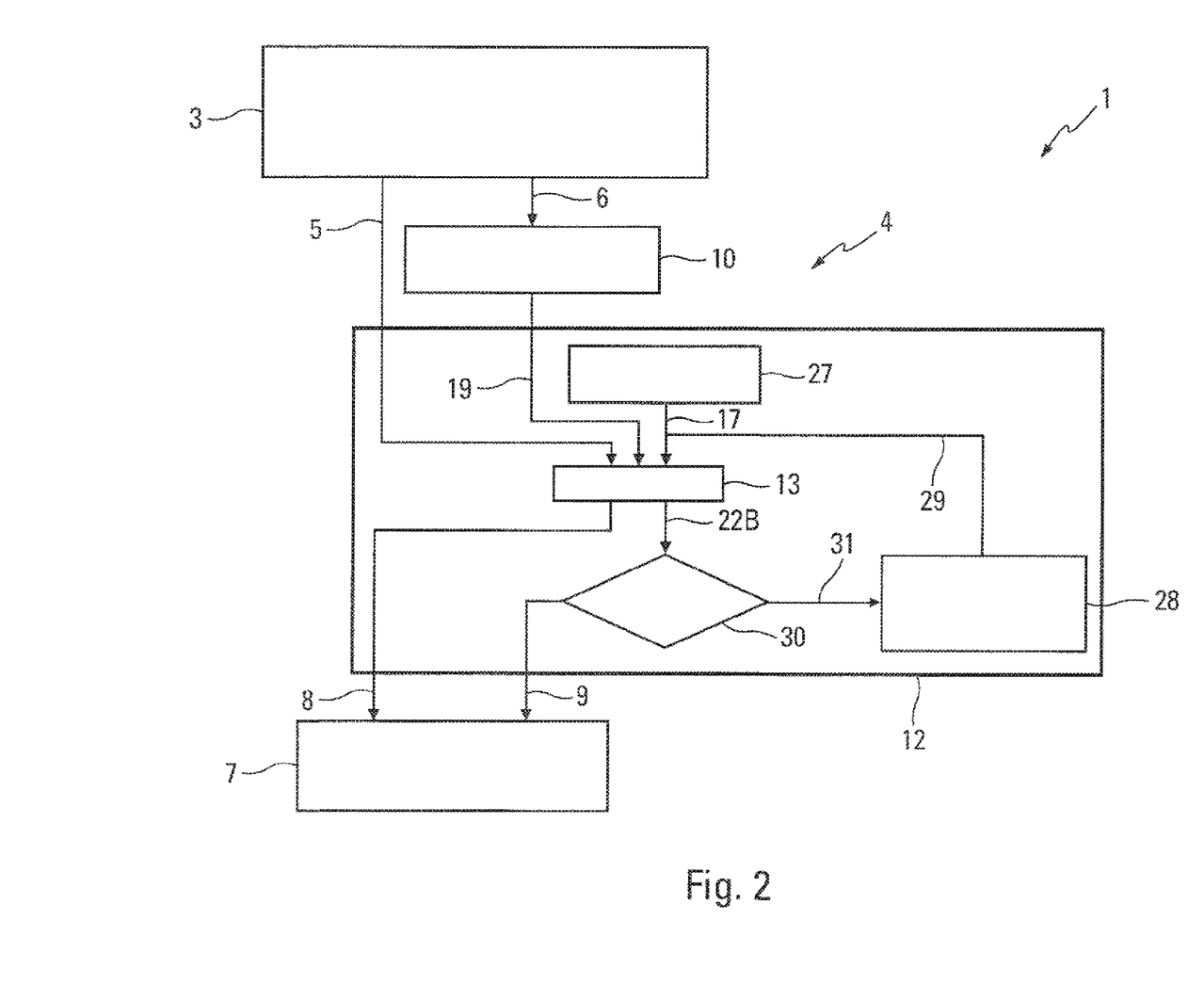
FIG. 2 is a block diagram of a device according to this invention.

The trajectory analysis device 1 according to this invention and schematically shown in FIG. 2 is provided for determining at least one takeoff trajectory of an aircraft, in particular of a transport aircraft AC. FIG. 1 schematically illustrates the takeoff of an aircraft AC being carried out from a takeoff runway 2, in the vicinity of which obstacles OB are present, in the present case, a mountain or a high hill. Generally, the takeoff of the aircraft AC is carried out following a standard takeoff trajectory T1, the lateral profile TL1 of which (representing the vertical projection of the trajectory T1 on the ground comprising a horizontal plane HO) is rectilinear and extends according to the axis 2A of the runway 2 to be used for the takeoff. Such a standard takeoff trajectory T1 is commonly referred to using the English acronym SID, for <<Standard Instrument Departure>>. In order to save the aircraft AC from having to fly over obstacles OB, an auxiliary takeoff trajectory T2 is also determined (commonly referred to using the English acronym EOSID, for <<Engine Out Standard Instrument Departure>>) allowing to meet the regulation constraints in case an engine breakdown occurs upon the takeoff. Such an auxiliary takeoff trajectory T2 of the EOSID type diverges, at a divergence point PV, from the standard takeoff trajectory T1 of the SID type (being defined for an aircraft having all its engines operating normally) and comprises an optimized lateral profile TL2 enabling to by-pass high obstacles. The takeoff (standard and auxiliary) trajectories T1 and T2 allow to fly over obstacles located along their respective lateral profiles TL1 and TL2. It is to be noticed that the auxiliary takeoff trajectory T2 enabling to by-pass high obstacles OB allows for a higher maximum takeoff weight than the standard takeoff trajectory T1.

FIG. 1 also shows a takeoff trajectory T3 of the SID type, being defined on the axis 2A of the runway 2 and being followed by the aircraft AC when a breakdown occurs at a point P1 where the aircraft AC is running on the runway 2 at a decision speed V1 as set forth herein below. In such a case, the aircraft AC is not able to fly over the obstacles OB.

The divergence point PV is defined so that, if a breakdown of an engine occurs upstream (or at the level) of such a divergence point PV, the pilot turns off the aircraft AC to the auxiliary takeoff trajectory T2 when the aircraft AC reaches such a divergence point PV. On the other hand, if the engine breakdown occurs when the aircraft AC has exceeded the divergence point PV, the pilot follows the takeoff of the aircraft AC on the standard takeoff trajectory of the SID type.

Furthermore, the decision speed V1 is defined so that, if an engine breakdown occurs upon running on the runway 2 for taking off while the aircraft AC has not reached such a decision speed V1 yet, that is upstream the point P1, the remaining runway length is sufficient for allowing the aircraft AC to slow down and to stop within the boundaries of the runway 2. On the other hand, when an engine breakdown occurs while the speed of the aircraft AC is equal to or higher than such a decision speed V1, the aircraft is no longer able to stop on the remaining runway length and should therefore continue the takeoff.

Consequently, three cases (being respectively illustrated by phases PH1, PH2 and PH3 in FIG. 1) are to be taken into consideration depending on the time when the engine breakdown occurs, that is:
  if the engine breakdown occurs before the aircraft AC reaches the decision speed V1 (phase PH1), the pilot performs a braking and the aircraft AC stops within the boundaries of the runway 2;
  if the engine breakdown occurs between the decision speed V1 and the divergence point PV (phase PH2), or otherwise stated, when the aircraft AC is located between the point P1 and the divergence point PV, the pilot continues the takeoff and turns off to the auxiliary takeoff trajectory T2 of the EOSID type, when it reaches the divergence point PV; and
  if the engine breakdown occurs after the divergence point PV (phase PH3), the pilot continues his takeoff on the standard takeoff trajectory of the SID type.

Naturally, in the absence of an engine breakdown, the pilot carries out a standard takeoff along the standard takeoff trajectory T1 (of the SID type) that has been defined for a takeoff with no engine breakdown, following a lateral, preferably rectilinear, trajectory TL1 (but non exclusively).

The aim of the trajectory analysis device 1 according to this invention is to determine an optimum auxiliary takeoff trajectory T2 concerning the maximum takeoff weight, while meeting the regulation constraints (calculated for a breakdown occurring at the decision speed V1) and ensuring flying over the obstacles OB for an engine breakdown occurring at any subsequent time.

To this end, the trajectory analysis device 1 comprises, as shown in FIG. 2:
  an initial data generation device 3 for generating initial data comprising the lateral profile of the standard takeoff trajectory, data relating to the environment of the takeoff airport, and nominal takeoff conditions. Such initial data generation device 3 are, preferably, interface devices allowing an operator to enter in the trajectory analysis device 1 the above-mentioned information, in particular a computer keyboard and/or a mouse associated with a screen;
  an auxiliary trajectory determination device 4 being connected via links 5 and 6 to the initial data generation device 3 and being formed so as to automatically determine by the initial data, an auxiliary takeoff EOSID trajectory, as well as obstacles OB likely to be flown over for nominal takeoff conditions; and
  a display device 7 being connected via links 8 and 9 to the auxiliary trajectory determination device 4 and being formed so as to automatically present the results of the processing carried out by the auxiliary trajectory determination device 4 to an operator of the aircraft AC, in particular to the pilot of the aircraft AC.

According to the invention, the auxiliary trajectory determination devices 4 are completely automatic and they more specifically comprise a automatic trajectory optimizer device 12 for carrying out an optimization so as to obtain an auxiliary takeoff trajectory T2 taking into consideration various takeoff conditions, as well as additional obstacles OB likely to be flown over for non nominal takeoff conditions.

So, the trajectory analysis device 1 according to this invention automatically determines the trajectory (auxiliary takeoff trajectory T2) for maximizing the takeoff weight of the aircraft AC, allowing the work load of an operator to be reduced when using the trajectory analysis device 1 to simply entering data using the initial data generation device 3.

The initial data generation device 3 allows to enter the following data:
  data relative to ground and the neighborhoods thereof presenting the relief and obstacles OB (level curves, that is, the altitude or the height with respect to the runway 2);
  characteristics of the takeoff runway 2, such as the length thereof, supplied, for example, by usual maps of the Jeppessen type;
  the lateral profile of the SID trajectory, supplied, for example, by usual maps of the Jeppessen type; and
  nominal takeoff conditions (weather conditions, aerodynamic configuration of the aircraft AC).

The auxiliary trajectory determination device 4 comprises a characteristics calculation device 10 for automatically calculating the characteristics of the takeoff according to the lateral profile of the SID trajectory, supplied by the initial data generation device 3. The characteristics calculation device 10 allows to determine the highest weight allowing to meet all the regulation constraints of the flight manual upon a takeoff following the SID trajectory. More precisely, the characteristics calculation device 10 determines, usually, by a known software, for the entered data relating to the SID trajectory:
  the maximum takeoff weight; and
  characteristic speeds of the takeoff, namely:
  the decision speed V1;
  a rotation speed VR upon takeoff; and
  a speed V2 representing the speed of the aircraft AC at a height of 35 feet above the ground with one defective engine.

Such data calculated by the characteristics calculation device 10 is, respectively, referred to as the initial weight and the initial characteristic speeds.

Figure 3:
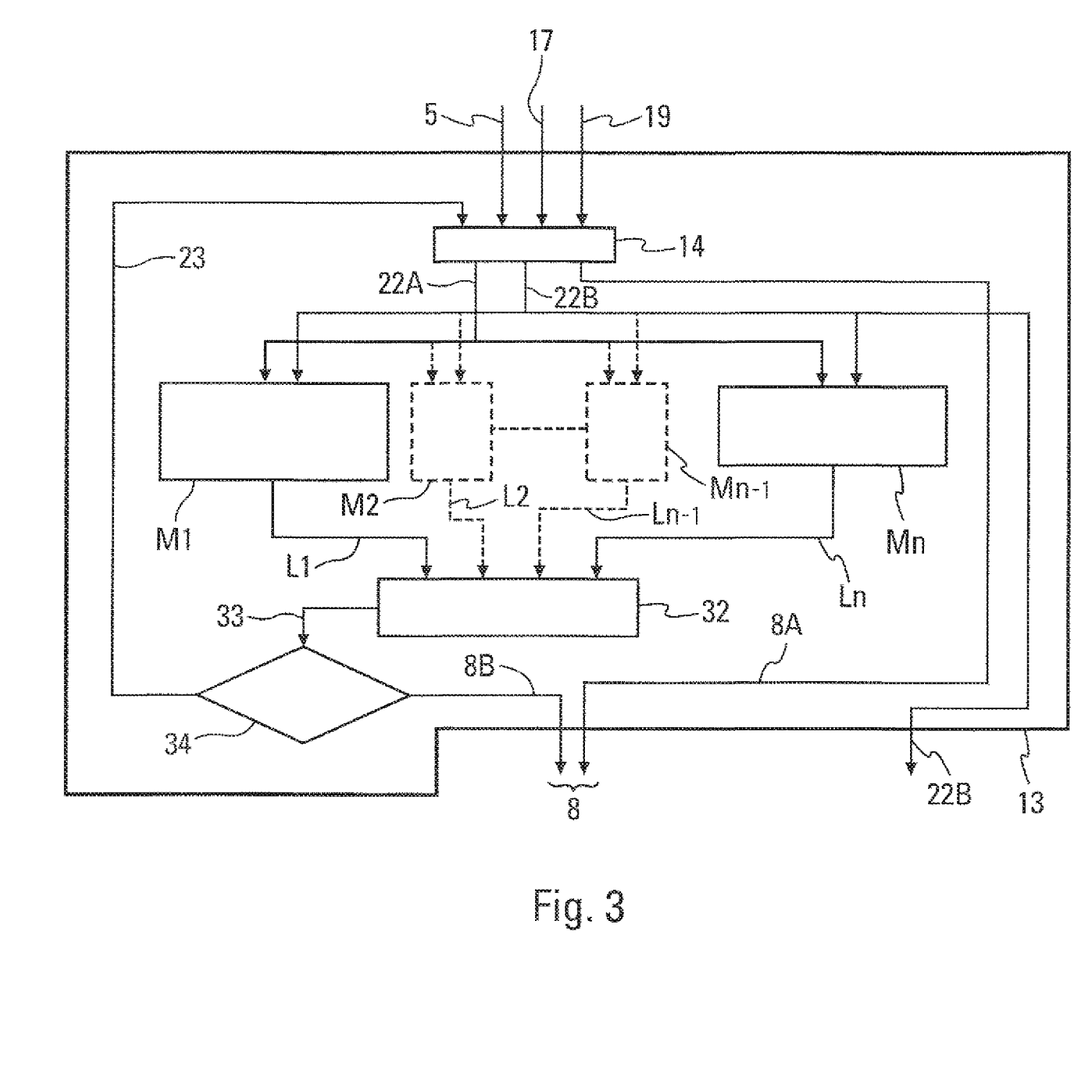
FIGS. 3 and 4 schematically show different devices and components being part of a device according to this invention.

The auxiliary trajectory determination device 4 further comprises an automatic trajectory optimizer device 12 comprising a maximum weight evaluator 13 being shown in FIG. 3. Such a maximum weight evaluator 13 is in turn provided with a nominal obstacle evaluator 14 being shown in FIG. 4.

Figure 4:
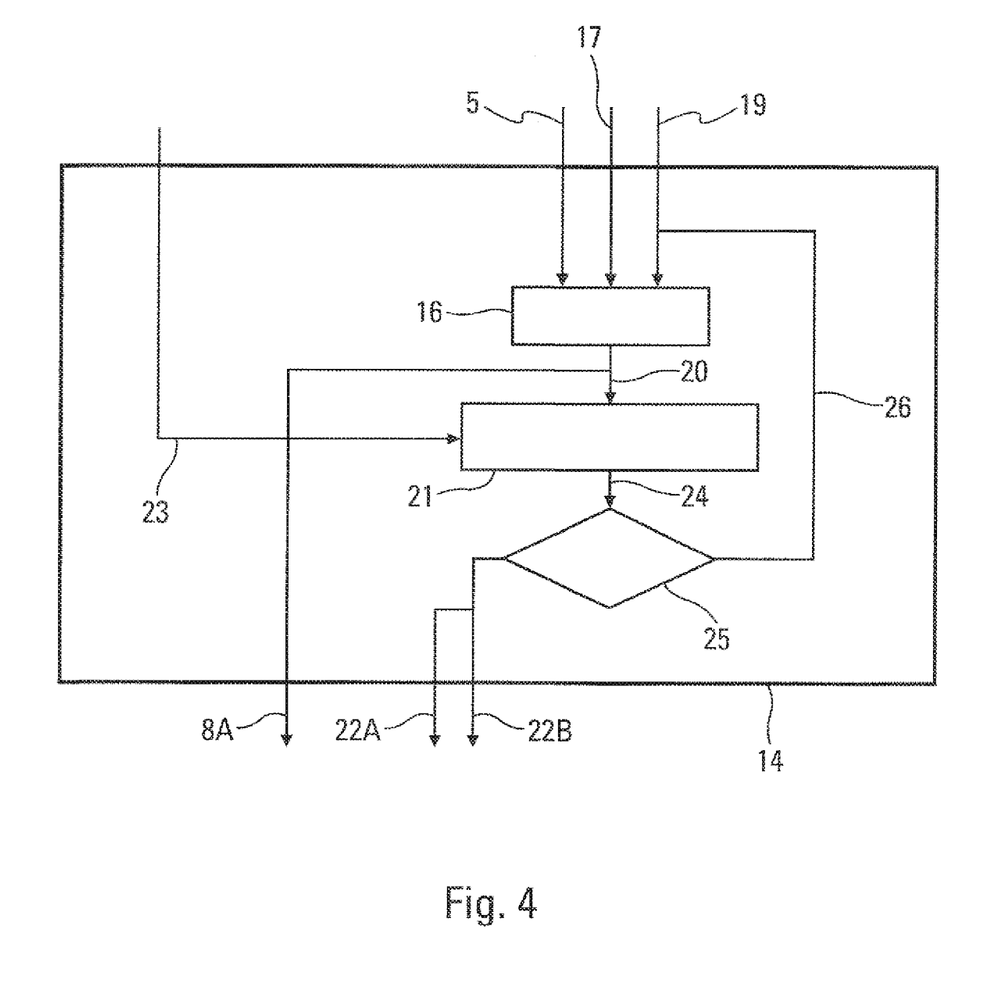

The nominal obstacle evaluator 14 comprises a nominal lateral profile calculation device 16 receiving:
  via the link 5, nominal takeoff conditions being entered by the operator;
  via a link 17, an EOSID trajectory to be described herein below (being defined, usually, as a sequence of piloting instructions); and via a link 19 being connected to the characteristics calculation device 10, the initial weight and the initial characteristic speeds determined by the characteristics calculation device 10.

Such nominal lateral profile calculation device 16 calculates, from the maximum weight and the speed V2 of the aircraft AC at the takeoff end, the nominal lateral profile of the EOSID trajectory resulting therefrom, as well as a nominal set of obstacles (that is, a set of obstacles likely to be flown over). Such information is transmitted via a link 20 to the weight/speed calculation device 21. Furthermore, the nominal set of obstacles is transmitted via a link 8A to the outlet of the maximum weight evaluator 13.

The weight/speed calculation device 21 calculates, from information received from the nominal lateral profile calculation device 16 and additional obstacles (to be described herein below) received via a link 23, the maximum weight, as well as the associated characteristic speeds V1, VR and V2 ensuring that regulation constraints are respected. Such information are transmitted via a link 24 to the convergence detection device 25 checking whether there is some convergence regarding the weight and the speeds. Should the response be positive, the convergence detection device 25 transmits the maximum weight and the characteristic speeds received from the weight/speed calculation device 21, via links 22A and 22B. On the other hand, should the response be negative, the convergence detection device 25 retransmits such information via a link 26 to the nominal lateral profile calculation device 16 that reinitiates the above mentioned processing. Such processing is thus carried out in an iterative way until a convergence is achieved about the weight and the characteristic speeds.

Within the scope of this invention, it is considered that there is a convergence on a parameter when the value of such a parameter, coming out of a calculation loop, converges to the value previously entered into this loop, that is when the difference between those (entering and outgoing) values is lower than a predetermined threshold.

The nominal obstacle evaluator 14 thus provides, from a set of piloting instructions, describing an EOSID trajectory, and an additional set of obstacles being received via the link 23, the maximum takeoff weight and the associated characteristic speeds V1, VR and V2 for checking the set of regulation constraints (for a breakdown at the decision speed V1), as well as the set of dimensioning obstacles on the nominal trajectory.

Such a nominal obstacle evaluator 14 is integrated within a loop for identifying the set of dimensioning obstacles for engine breakdowns occurring after the decision speed V1. The thus formed set makes up the evaluator 13 of FIG. 3.

Such a maximum weight evaluator 13 comprises, in addition to the nominal obstacle evaluator 14, a set of current calculation devices M1, M2, . . . , Mn−1, Mn providing at the outlet thereof to additional obstacle set collection device 32, via respectively links L1, L2, Ln−1, Ln, an additional set of obstacles defined for non nominal conditions.

The devices M1 to Mn−1 each calculate calculates currently an EOSID trajectory respectively for one of a plurality of breakdown instants, for example for ten breakdown instants, located between points P1 and PV and provide to the outlets thereof the corresponding obstacles. Such n−1 different breakdown instants (respectively used by devices M1 to Mn−1) may be:
  predetermined instants; or
  randomly selected instants; or
  instants corresponding to points being distributed, for example uniformly, between points P1 and PV.

Moreover, the device Mn usually calculates the SID trajectory for an engine breakdown occurring at the divergence point PV, and supply the corresponding obstacles likely to be flown over in such conditions.

The additional obstacle set collection device 32 transmits such an additional set of obstacles, via a link 33, to the conveyance checking device 34 checking the convergence of the set of obstacles. Should the response be positive, such obstacles are transmitted via a link 8B together to the nominal set of obstacles received from the nominal obstacle evaluator 14 via the link 8A, the links 8A and 8B making up the link 8. On the other hand, should the response be negative, such an additional set of obstacles is re-injected into the nominal obstacle evaluator 14 via the link 23. And the above mentioned processing is reinitiated until a convergence is obtained on the set of obstacles.

Furthermore, as illustrated in FIG. 2, the automatic trajectory optimizer device 12 comprises, in addition to the maximum weight evaluator 13, current EOSID trajectory population determining device 27 for randomly determining an initial population of EOSID trajectories.

The maximum weight evaluator 13 enables to associate with an EOSID candidate a maximum weight corresponding to the nominal takeoff and taking into consideration additional obstacles, should a breakdown occur after the decision speed V1. Such a maximum weight evaluator 13 comprises the evaluation function being used in the optimization loop implemented in the automatic trajectory optimizer device 12, via, more specifically, the trajectory optimization algorithm 28 comprising an overall optimization algorithm and modifying the EOSID population transmitted to the maximum weight evaluator 13 via a link 29. The maximum weight being determined by the maximum weight evaluator 13 is provided via the link 22B to the convergence checking device 30 checking the convergence on the weight. Should the response be positive, they transmit the optimum EOSID trajectory, via the link 9, to the display device 7. On the other hand, should the response be negative, they inform the trajectory optimization algorithm device 28 via a link 31 so that the latter modify the EOSID population used by the maximum weight evaluator 13. The latter processing is carried out in an iterative way until a convergence is reached on the weight.

The optimization implemented by auxiliary trajectory determination device 4, preferably, uses a genetic algorithm having the double particularity of supplying an optimum solution being really independent from the initial solution being transmitted to it, and of generating, not a single solution, but a family of different good quality solutions.

The trajectory analysis device 1 according to this invention therefore allows to find auxiliary takeoff trajectories of better qualities, both from the stand point of the maximum weight, as from the standpoint of safety, in so far as it allows to contemplate numerous different takeoff conditions, in particular relating to the breakdown instants.

It should further be noticed that the present invention:
  introduces within the EOSID optimization loop itself, checking the possibility of flying over obstacles on the EOSID trajectory for an engine breakdown occurring between the decision speed V1 and the divergence point PV, and on the SID standard takeoff trajectory for a breakdown occurring after the divergence point PV. Thus, not only other cases than breakdowns at the decision speed V1 and the convergence point PV are taken into consideration for calculating the optimized criterion, but, in addition, the drawbacks that those other cases induce in terms of takeoff weight are minimized; and implements an overall optimization algorithm allowing:
to lead to a better solution without requiring to foresee, at first sight, the behaviour of the trajectory; and
to supply several alternative solutions, close to the optimum solution from the standpoint of the maximum weight, but not necessarily from the standpoint of the lateral profile thereof.

Thus, a robustness analysis could be implemented on the most relevant trajectories, so as to select the one that leads to the largest mean takeoff weight for the set of possible takeoff conditions (weather conditions, aerodynamic configuration).

The trajectory analysis device 1 also comprises devices (not shown and being part, for example, of display device 7) for calculating the maximum takeoff weight, via the optimum auxiliary takeoff trajectory and obstacles likely to be flown over, determined by the auxiliary trajectory determination device 4.

The invention claimed is:

1. A method for determining at least one auxiliary takeoff trajectory of an aircraft that maximizes an allowable takeoff weight of the aircraft, wherein the auxiliary takeoff trajectory includes a curvilinear lateral profile and diverges at a divergence point from a standard takeoff trajectory, wherein the standard takeoff trajectory includes a lateral profile and is defined for an aircraft having all engines operating normally, wherein the auxiliary takeoff trajectory is defined for an aircraft having at least one engine being defective, and both the standard takeoff trajectory and the at least one auxiliary takeoff trajectory configured to allow for flight over obstacles located along the respective lateral profiles, the method comprising:
   a) generating initial data with an initial data generation device on the aircraft, the initial data including the lateral profile of the standard takeoff trajectory, data relating to the environment of the takeoff airport, and nominal takeoff conditions;
   b) automatically determining with an auxiliary trajectory determination device on the aircraft the auxiliary takeoff trajectory and first obstacles likely to be flown over for the nominal takeoff conditions, based on the initial data and without action by an operator of the aircraft, the auxiliary trajectory determination device also optimizing the auxiliary takeoff trajectory to take into consideration various takeoff conditions and determining second obstacles likely to be flown over for non-nominal takeoff conditions; and
   c) displaying with a display device on the aircraft the auxiliary takeoff trajectory and the first and second obstacles to an operator.

2. The method according to claim 1, wherein step b) further comprises:
   b1) automatically determining with a characteristics calculation device an initial maximum weight and initial characteristic speeds allowing to carry out a takeoff on the standard takeoff trajectory;
   b2) automatically determining with a maximum weight evaluator a maximum auxiliary takeoff weight and associated auxiliary characteristic speeds, relating to a given auxiliary takeoff trajectory in nominal conditions, as well as the first obstacles for such nominal conditions, the maximum weight evaluator using the initial maximum weight and the initial characteristic speeds, as well as the second obstacles and piloting instructions describing the given auxiliary takeoff trajectory, to automatically determine the maximum auxiliary takeoff weight and the associated auxiliary characteristic speeds;
   b3) calculating with a nominal obstacle evaluator the first obstacles for breakdowns occurring between a decision speed and the speed at said divergence point for the auxiliary takeoff trajectory and at the divergence speed for the standard takeoff trajectory; and
   b4) optimizing the given auxiliary takeoff trajectory with an automatic trajectory optimizer that includes the maximum weight evaluator and the nominal obstacle evaluator, and repeating the optimizing until an optimum auxiliary takeoff trajectory is obtained.

3. The method according to claim 1, wherein the auxiliary trajectory determination device includes processors of the genetic type for performing step b).

4. The method according to claim 1, further comprising:
   e) calculating with a weight/speed calculation device a corresponding maximum takeoff weight using the optimum auxiliary takeoff trajectory and the second obstacles likely to be flown over.

5. A trajectory analysis device for determining at least one auxiliary takeoff trajectory of an aircraft that maximizes an allowable takeoff weight of the aircraft, wherein the auxiliary takeoff trajectory includes a curvilinear lateral profile and diverges at a divergence point from a standard takeoff trajectory, wherein the standard takeoff trajectory includes a lateral profile and is defined for an aircraft having all engines operating normally, wherein the auxiliary takeoff trajectory is defined for an aircraft having at least one engine being defective, and both the standard takeoff trajectory and the at least one auxiliary takeoff trajectory configured to allow for flight over obstacles located along the respective lateral profiles, the trajectory analysis device comprising:
   an initial data generation device that generates initial data including the lateral profile of the standard takeoff trajectory, data relating to the environment of the takeoff airport, and nominal takeoff conditions;
   an auxiliary trajectory determination device that automatically determines, based on the initial data and without action by an operator of the aircraft, the auxiliary takeoff trajectory and first obstacles likely to be flown over for the nominal takeoff conditions, the auxiliary trajectory determination device also optimizing the auxiliary takeoff trajectory to take into consideration various takeoff conditions and determining second obstacles likely to be flown over for non-nominal takeoff conditions; and
   a display device that displays to the operator the auxiliary takeoff trajectory and the first and second obstacles.

6. The trajectory analysis device of claim 5, wherein the auxiliary trajectory determination device further comprises:
   a characteristics calculation device for automatically determining an initial maximum weight and initial characteristic speeds allowing to carry out a takeoff on the standard takeoff trajectory;
   a maximum weight evaluator for automatically determining a maximum auxiliary takeoff weight and associated auxiliary characteristic speeds, relating to a given auxiliary takeoff trajectory in nominal conditions, as well as the first obstacles for such nominal conditions, the maximum weight evaluator using the initial maximum weight and the initial characteristic speeds, as well as the second obstacles and piloting instructions describing the given auxiliary takeoff trajectory, to automatically determine the maximum auxiliary takeoff weight and the associated auxiliary characteristic speeds;
   a nominal obstacle evaluator for calculating the first obstacles for breakdowns occurring between a decision speed and the speed at said divergence point for the auxiliary takeoff trajectory and at the divergence speed for the standard takeoff trajectory; and an automatic trajectory optimizer that optimizes the given auxiliary takeoff trajectory and repeats the optimizing until an optimum auxiliary takeoff trajectory is obtained.

7. The trajectory analysis device of claim 5, wherein the auxiliary trajectory determination device further comprises processors of the genetic type.

8. The trajectory analysis device of claim 5, further comprising:

a weight/speed calculation device for calculating a corresponding maximum takeoff weight, using the optimum auxiliary takeoff trajectory and the second obstacles likely to be flown over.

* * * * *